Jan. 18, 1949.  C. F. ROBBINS  2,459,538
MACHINE FOR MARKING ON CYLINDRICAL ARTICLES
Filed Nov. 14, 1944  4 Sheets-Sheet 1

INVENTOR.
Charles F. Robbins
BY
Heard Smith & Tennent
Att'ys.

Jan. 18, 1949.　　　　　C. F. ROBBINS　　　　　2,459,538
MACHINE FOR MARKING ON CYLINDRICAL ARTICLES
Filed Nov. 14, 1944　　　　　　　　　　　　　　　4 Sheets-Sheet 2

INVENTOR.
Charles F. Robbins
BY
Heard Smith + Tennant
Attys.

Jan. 18, 1949.     C. F. ROBBINS     2,459,538
MACHINE FOR MARKING ON CYLINDRICAL ARTICLES
Filed Nov. 14, 1944.     4 Sheets-Sheet 4
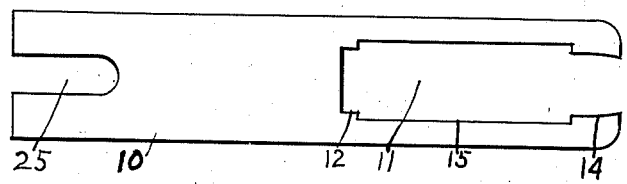
Fig. 4
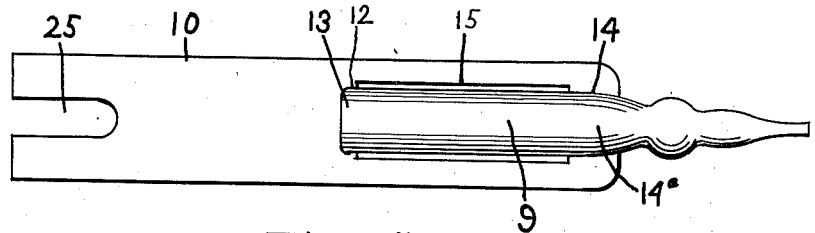
Fig. 5
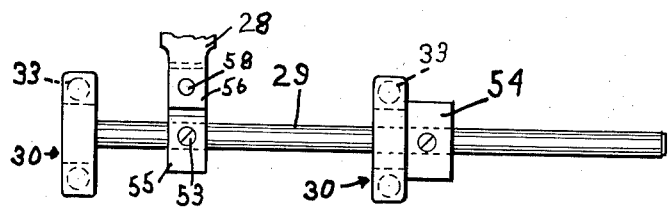 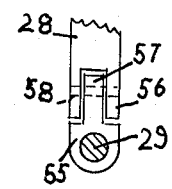
Fig. 6     Fig. 8
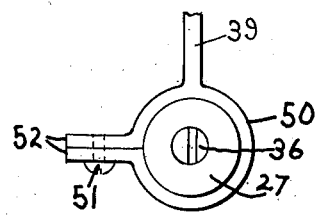
Fig. 7
INVENTOR.
Charles F. Robbins
BY
Heard Smith & Tennant
Attys.

Patented Jan. 18, 1949

2,459,538

UNITED STATES PATENT OFFICE 2,459,538

MACHINE FOR MARKING ON CYLINDRICAL ARTICLES

Charles F. Robbins, Keene, N. H., assignor to Markem Machine Company, Keene, N. H., a corporation of New Hampshire Application November 14, 1944, Serial No. 563,329

6 Claims. (Cl. 101—38)

This invention relates to a machine for making an imprint on cylindrical articles, and it has for its general object to provide a machine by which an even imprint can be made on the cylindrical article even though the exterior surface of the article departs more or less from a true cylindrical surface either because of a variation in the concentricity of such exterior surface or because of a variation in the diameter at different points in the length of the article.

A further object of the invention is to provide a novel machine of this class by which an even uniform imprint can be made on all the cylindrical articles of a certain group of articles even though the articles comprising the group do not all have the same diameter.

Machines now in use for marking cylindrical articles comprise a rotary printing roll carrying on its periphery a type member, which preferably is made of rubber or some other yieldable material, and also some suitable means such as a chuck or a mandrel for supporting the cylindrical article to be marked with its axis parallel to the axis of the printing roll, means being provided to rotate the chuck or mandrel so as to give the article to be marked the same surface speed as that of the printing roll.

In a machine of this type the article is rotated about a fixed axis while the imprint is being made thereon, and while such a machine operates satisfactorily where the cylindrical article has a true cylindrical exterior surface, yet if the surface of such article is not a true cylinder, either by reason of the fact that the concentricity of said surface varies at different points or the article does not have a uniform diameter from one end to the other, the imprint which is made on the article is likely to be uneven, said imprint being heavier on the high portions of the article than on the low portions thereof.

There is a considerable commercial demand for cylindrical articles made of glass, such for instance as bottles, vials, medical ampules, etc., carrying an imprint on their exterior surface. Such articles of glass are very apt to have an exterior surface which departs more or less from a true cylindrical surface in the manner referred to above, and when the imprint on such articles is made in a machine in which the articles rotate about a fixed axis, the resulting imprint on the article will vary in shade from one portion thereof to the other.

As stated above, it is an object of my present invention to provide a novel machine for printing on cylindrical objects which will produce an even uniform imprint regardless of any variations in concentricity or diametrical dimension which exists in any article.

I accomplish this object by providing a novel holder for the article to be printed which permits the article during the printing operation to rotate freely about an unconfined axis, the position of which may vary during the rotation of the article as necessary to maintain an even printing pressure between the surface of the article and the type member.

In order to give an understanding of my invention, I have illustrated in the drawings a selected embodiment thereof which will now be described after which the novel features will be pointed out in the appended claims.

Figure 3:
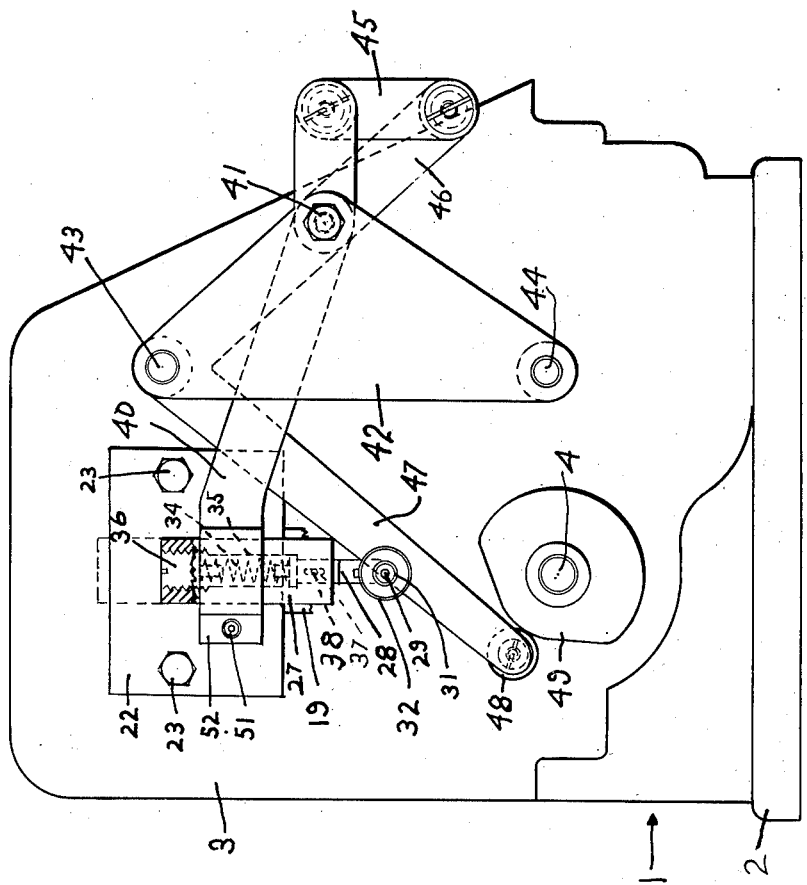

Fig. 3 is an end view with the printing roll removed illustrating the means for operating the hold-down, Fig. 4 is a view of the holder which is used for holding the article during the printing operation, Fig. 5 is a similar view illustrating a medical ampule in the holder, Fig. 6 is a fragmentary sectional view of the hold-down element, Fig. 7 is a fragmentary view showing in top plan view the holder for the hold-down.

Fig. 8 is a sectional view through the shaft 29 showing the plunger element 28 in elevation.

The machine herein illustrated comprises a suitable frame 1 having a base portion 2 and an upright supporting flange or plate 3. This frame supports a suitable shaft 4 on which is mounted a printing roll indicated generally at 5. The shaft 4 may be driven by any suitable means, such for instance as a motor 6 which is shown as being enclosed in a suitable casing 7.

The printing roll 5 carries on its periphery a printing plate or type element 8, which preferably is made of rubber or some yieldable material, and which carries on its surface the requisite type characters to make the desired print on the cylindrical article.

This type element 8 may be secured to the printing roll by any suitable or usual means. As herein shown the roll 5 has mounted on its periphery two rings 54 of rubber or some other suitable material which are located either side of the type element 8 and which serve to support the cylindrical article during the printing operation. The rings 54 may be adjusted relative to each other on the roll 5 to accommodate type elements 8 of different sizes and to enable the type element to be adjusted on the roll in an axial direction and also to accommodate cylindrical articles of different lengths. These bands constitute in effect two parallel circumferential article-supporting ribs, and, as stated above, they may be made of any suitable material.

In the illustrated embodiment of the invention the cylindrical article to be printed is in the nature of a glass medical ampule 9, but it will be understood that the invention is equally applicable for making imprints on a large variety of other cylindrical articles. For holding the article 9 while the imprint is being made thereon, I employ an article holder which is situated directly above the printing roll 5 and closely adjacent the periphery thereof, which holder is provided with an opening of a size to freely receive the cylindrical article to be printed when the latter is in a position with its axis substantially parallel to the axis of the printing roll. The article holder is supported so that when the article to be printed is resting on the printing roll 5, it will occupy said opening and is free to rotate therein by the frictional engagement thereof with the printing roll but is held from horizontal movement of translation. Since the article is loosely retained in said opening, the position thereof will shift in said opening during its rotating movement in response to any unevenness in its cylindrical surface, with the result that at all times the printing pressure between the article and the printing roll will be even, thus resulting in an imprint of uniform shade.

The article-holding member which I have herein shown is indicated at 10 and is in the form of a plate having a vertical opening 11 in its outer end which extends through the holder from the top to the bottom and which freely receive the article 9. This opening 11 has at one end a portion 12 having a width to freely receive the end 13 of the article 9 and at the other end a portion 14 of a shape and contour to receive the portion 14a of the article 9. Between the end portions 12 and 14, the opening 11 is widened somewhat as indicated at 15 so that when the article 9 is placed in the opening 11, it will have contact with the walls of the opening only at the end portions 12 and 14.

This opening 11, as stated above, is of a size to freely receive the ampule and thus to allow said ampule or other article to rotate freely while retained in the opening 11, the walls of the opening holding the ampule from any horizontal movement of translation during its rotary movement.

The holder 10 may be mounted on the frame in any suitable way and is preferably located just above the printing roll 5 and preferably at a distance therefrom not greater than one-half the diameter of the cylindrical article to be printed so that when the article 9 is placed in the opening 11 said article will rest on the printing roll.

In the present embodiment of my invention, the holder 10 is adjustably carried at one end by one arm 16 of an L-shaped bracket 17, the other arm of the bracket being made fast to a supporting member 18. This supporting member is shown as having a vertical leg 19 to which the bracket 17 is secured as by means of screws 20, a horizontal leg 21, and another vertical leg 22 which is fastened to the frame member 3 by means of suitable screws or bolts 23. The arm 16 of the bracket 17 is formed with side wings 24 between which the end of the holder 10 is received, and said holder is provided with a slot 25 to receive a clamping screw 26 by which the holder is clamped to the bracket arm 16. The slot 25 provides means for adjusting the holder in the direction of its length.

With this construction the article holder 10 is easily removed from the machine so that it can be readily replaced by a holder which has an opening that fits the particular article to be marked.

When an article 9 is dropped in the opening 11 of the holder, it will rest on the printing roll 5 and will be rotated by said roll as the latter rotates, the type element 8 operating to make the printed impression on the article during the rotation of the printing roll.

In order to make a satisfactory imprint, it is desirable that the article should be subjected to a slight pressure so as to maintain a proper printing pressure between the article and the printing roll during the printing operation.

For this purpose, I have provided a hold-down member which engages the article 9 during the printing operation. Means are also provided whereby the hold-down is raised from the article after the printing impression has been made so as to permit the article to be removed from the holder and a fresh unprinted article placed therein after which the hold-down moves into its operative position in engagement with the article. This hold-down may have any suitable construction, but I will preferably employ one in which the portions thereof that engage the article are freely rotatable so that there will be a rolling contact between the article and the hold-down as said article is turned during the printing operation by its engagement with the printing roll. The hold-down herein shown comprises a head 27 carrying a plunger element 28 which depends therefrom and which in turn has mounted therein a horizontal shaft 29. The shaft 29, which is a stationary, non-rotative shaft, has mounted thereon two ball bearing units 30, each of which comprises the usual inner race 31 and outer race 32 between which are the balls 33. The inner race is made fast to the shaft 29 and the outer race is, therefore, free to rotate.

The plunger 28 is yieldingly mounted in the head 27 and is backed by a suitable spring 34 which is confined in a recess 35 with which the head 27 is provided. The end of the recess 35 is closed by a screw plug 36 which forms a back for the spring 34. The plunger 28 is shown as having a slot 37 in which operates a pin 38, the purpose of which is to prevent the plunger from turning in the head while permitting it to yield backwardly. The head 27 is mounted on an arm 39 extending from one end of a lever 40 which is pivoted at 41 to a supporting plate 42, the latter being mounted on two studs 43, 44 which extend from the frame member 3.

Figure 1:
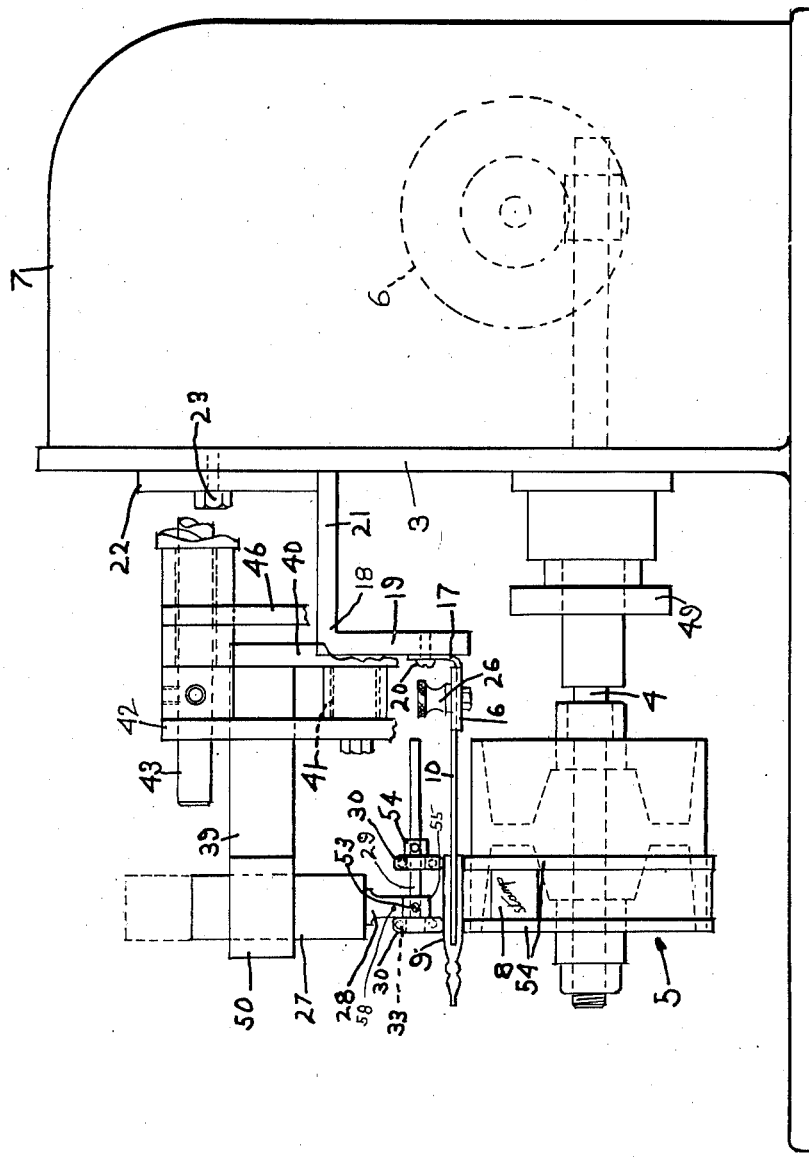
Fig. 1 is a side view of a marking machine embodying my invention.
Figure 2:
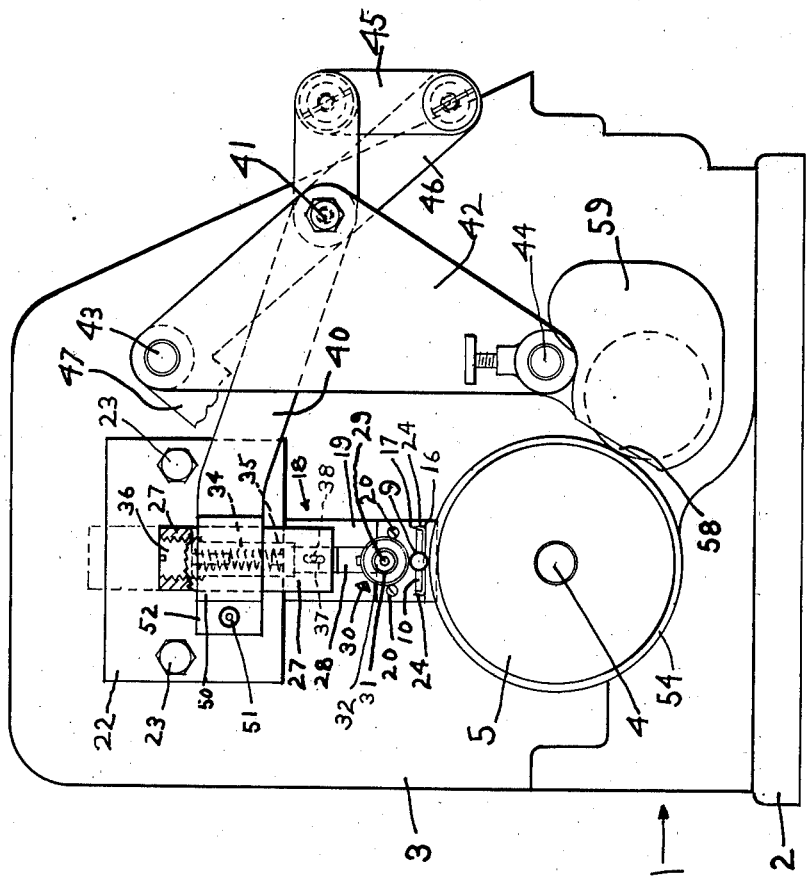
Fig. 2 is an end view thereof with parts broken out.

The outer end of the lever 40 is connected by a link 45 with one end of an elbow lever 46 which in turn is mounted on the stud 43, the arm 47 of said lever 46 carrying at its end a roll 48 adapted to engage a cam 49 mounted on the shaft 4. When the roll 48 engages the low portion of the cam 49, the hold-down will be in its lowered operative position in engagement with an article retained by the holder 10 while when the roll 48 is engaged with the high portion of the cam 49 the head 27 will be moved upwardly into its raised position indicated by dotted lines in Figs. 2 and 3 through the medium of the levers and links above described, thereby separating the hold-down from the article.

The head 27 is shown as being adjustably mounted in the arm 39 for which purpose the said arm is formed at its end with a split hub portion 50 that encircles the head 27 and is clamped to the head by means of a clamping screw 51 mounted in the two clamping flanges 52 of said split hub.

The shaft 29 is adjustably carried by the plunger 28 so that said shaft can be adjusted in the direction of its length, a set screw 53 being provided to lock the shaft in its adjusted position.

The two ball bearing elements 30 can also be adjusted longitudinally of the shaft and thereby they may be placed in position to engage the article 7 at any desired points, but preferably each side of the zone in which the imprint is to be made on said article.

The driving connection between the motor 6 and the printing roll 5 may include any suitable one-revolution clutch so that after the roll has made one revolution, the clutch will be disengaged and the roll will be brought to rest. Since such a clutch is commonly employed in various machines, I have not thought it necessary to illustrate it herein.

Such one-revolution clutch, if employed, will be arranged so that it will bring the shaft 4 to rest with the roll 48 engaging the high portion of the cam 49 and, therefore, with the hold-down in its raised position.

In the operation of the device the operator will place an article 9 to be marked in the opening 11 of the holder so that said article rests on the rubber rings 54 of the printing roll and then he will set the clutch in operation. As the shaft 4 rotates the roll 48 will pass on to the low portion of the cam 49, thus lowering the hold-down against the article 9 so that said article will be yieldingly pressed against the rubber rings 54 of the printing roll 5. The frictional engagement between said rings and the article 9 will cause the article to rotate at the same surface speed as that of the printing roll and during the rotation of said roll, the type element 8 will be moved past and into engagement with the article 9, thus making the desired imprint thereon. The roll 48 then passes on to the high portion of the cam 49, thus raising the hold-down, at which time the one-revolution clutch will bring the machine to rest. The operator then removes the printed article 9 and places an unprinted article in the holder, and the above operations are repeated.

Because each article 9 is freely received in the opening 11 of the holder and because the axis of the article is not confined radially, said article is free to rotate about its own but unconfined axis during the printing operation, and hence if the concentricity of the exterior surface of said article is not true, said article may move up and down in the opening 11 as necessary in order to obtain a uniform printing pressure between the article and the type element 8 regardless of any variation in concentricity of the article. If the article is one which has a slightly varying diameter from one end to the other, said article will automatically assume a position in the opening 11 by which an even printing pressure will be applied throughout the length of the article, and thus an even imprint may be produced thereon.

If a lot or batch of articles are being printed and the diameter of the different articles in the batch vary somewhat, the fact that each article is free to rotate about its own unconfined axis in the opening 11 makes it possible to produce an even uniform imprint on all the articles of the lot or batch even though they do vary in diameter.

In order to enable the hold-down elements 30 to apply an even pressure at both ends of a cylindrical article which may vary in diameter slightly from one end to the other, the lower end 55 of the plunger 28 in which the shaft 29 is mounted may be pivotally connected to the main portion of the plunger to swing about an axis extending at right angles to the shaft 59. In Figs. 6 and 8 the lower portion of the plunger is bifurcated to provide two spaced arms 56, and the end portion 55 of the plunger in which the shaft 29 is mounted is provided with a vertically extending stem portion 57 which is located between the arms 56 and is pivoted thereto by means of a pivot pin 58. This construction permits the shaft to turn slightly about an axis at right angles to the axis of the article 9 so that in case said article does vary slightly in diameter from one end to the other, the shaft 29 may automatically assume a position in which both ball bearing members 30 will apply the same pressure to the article.

I claim:

1. A machine for making imprints on cylindrical articles comprising a printing roll, a stationary holder for the cylindrical article to be printed situated directly above the printing roll and having a vertical opening extending entirely therethrough from the top to the bottom, which opening is of a size and shape to freely receive between its sides the cylindrical article to be printed with the axis of said article extending parallel to that of the printing roll, said holder being sufficiently close to the printing roll so that a cylindrical article situated between the sides of the opening and resting on said printing roll is held from horizontal movement of translation by the sides of the opening, and means to rotate the printing roll and by the frictional engagement between it and the cylindrical article occupying said opening and resting thereon, to rotate said cylindrical article within said opening thereby to make a printed impression on the article.

2. A machine for making imprints on cylindrical articles comprising a printing roll, a stationary holder for the cylindrical article to be printed situated directly above the printing roll and having a vertical opening extending entirely therethrough from the top to the bottom, which opening is of a size and shape to freely receive between its sides the cylindrical article to be printed with the axis of said article extending parallel to that of the printing roll, said holder being sufficiently close to the printing roll so that a cylindrical article situated between the sides of the opening and resting on said printing roll is held from horizontal movement of translation by the sides of the opening, and means to rotate the printing roll and by the frictional engagement between it and the cylindrical article occupying said opening and resting thereon, to rotate said cylindrical article within said opening thereby to make a printed impression on the article, and a hold-down member engaging said cylindrical article while in the holder and yieldingly pressing it against the printing roll during the printing operation.

3. A machine for making imprints on cylindrical articles comprising a printing roll, a stationary holder for the cylindrical article to be printed situated directly above the printing roll and having a vertical opening extending entirely therethrough from the top to the bottom, which opening is of a size and shape to freely receive between its sides the cylindrical article to be printed with the axis of said article extending parallel to that of the printing roll, said holder being spaced from the printing roll by a distance no greater than one-half of the diameter of said cylindrical article to be printed whereby a cylindrical article occupying the opening will rest on and be supported by the printing roll while the sides of the opening in the stationary holder will prevent horizontal movement of translation of said article, and means to rotate the printing roll and by the frictional engagement between it and a cylindrical article occupying said opening and resting thereon to rotate said article thereby to make a printed impression thereon.

4. A machine for making imprints on cylindrical articles, comprising a printing roll, a stationary holder for the cylindrical article to be printed situated directly above the printing roll and having a vertical opening extending entirely therethrough from the top to the bottom, which opening is of a size and shape to freely receive between its sides the cylindrical article to be printed with the axis of said article extending parallel to that of the printing roll, said holder being spaced from the printing roll by a distance no greater than one-half the diameter of the cylindrical article, whereby such article occupying the opening will rest on and be supported by the printing roll, but will be held against horizontal bodily movement by the sides of the opening, a hold-down engaging said cylindrical article and yieldingly pressing it against the printing roll, and means to rotate the printing roll and by the frictional engagement between it and the cylindrical article to rotate said article while occupying the opening thereby to make a printed impression thereon.

5. A machine for making imprints on cylindrical articles comprising a printing roll having two parallel circumferential article-supporting ribs, a printing plate on the periphery of said roll between said ribs, a stationary holder for the cylindrical article to be printed situated above the printing roll and at a distance therefrom not more than one-half the diameter of said cylindrical article, said holder having a vertical opening extending entirely therethrough from the top to the bottom, which opening is of a size and shape to freely receive between its sides the cylindrical article to be printed with its axis parallel to that of the printing roll, whereby such a cylindrical article occupying the opening will be resting on and supported by the peripheral ribs of the printing roll, and means to rotate the printing roll and by the frictional engagement between said ribs and the cylindrical article occupying the opening to rotate the article within the opening thereby to make a printed impression.

6. A machine for making imprints on cylindrical articles comprising a printing roll having two parallel circumferential article-supporting ribs, a printing plate on the periphery of said roll between said ribs, a stationary holder for the cylindrical article to be printed situated above the printing roll and at a distance therefrom not more than one-half the diameter of said cylindrical article, said holder having a vertical opening extending entirely therethrough from the top to the bottom, which opening is of a size and shape to freely receive between its sides the cylindrical article to be printed with its axis parallel to that of the printing roll, whereby such a cylindrical article occupying the opening will be resting on and supported by the peripheral ribs of the printing roll, and means to rotate the printing roll and by the frictional engagement between said ribs and the cylindrical article occupying the opening to rotate the article within the opening thereby to make a printed impression, and a hold-down engaging said cylindrical article while occupying said opening and yieldingly pressing it against the printing roll.

CHARLES F. ROBBINS.

REFERENCES CITED

The following references are of record in the file of this patent:

UNITED STATES PATENTS

| Number | Name | Date |
| --- | --- | --- |
| 1,193,297 | Porcher | Aug. 1, 1916 |
| 1,499,796 | Wilkinson | July 1, 1924 |
| 1,526,357 | Manischewitz | Feb. 17, 1925 |
| 1,657,382 | Felten | Jan. 24, 1928 |
| 1,926,356 | Tarlton | Sept. 12, 1933 |
| 2,088,196 | Frieden | July 27, 1937 |
| 2,101,775 | Bullard | Dec. 7, 1937 |
| 2,190,740 | Swift et al. | Feb. 20, 1940 |
| 2,302,058 | Robbins et al. | Nov. 17, 1942 |

FOREIGN PATENTS

| Number | Country | Date |
| --- | --- | --- |
| 493,857 | Great Britain | Oct. 17, 1938 |